(12) United States Patent
Corriveau et al.

(10) Patent No.: US 6,562,382 B1
(45) Date of Patent: May 13, 2003

(54) CONFECTIONERY PRODUCTS HAVING IMPROVED SHELF LIFE AND METHODS FOR THEIR PRODUCTION

(75) Inventors: Christine L. Corriveau, Orland Park, IL (US); Timothy Guydan, Naperville, IL (US); Michael McHale, Aurora, IL (US); S. Kristine Cahill, Sugar Grove, IL (US); Gregory J. Milosch, Oswego, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 299 days.

(21) Appl. No.: 09/633,185

(22) Filed: Aug. 4, 2000

Related U.S. Application Data

(60) Provisional application No. 60/147,311, filed on Aug. 5, 1999.

(51) Int. Cl.⁷ .................................................. A23G 3/30
(52) U.S. Cl. ............................ 426/5; 426/103; 426/660
(58) Field of Search .............................. 426/5, 660, 103

(56) References Cited

U.S. PATENT DOCUMENTS

| | | | | |
|---|---|---|---|---|
| 1,771,506 A | | 7/1930 | Mustin | 426/5 |
| 1,771,982 A | | 7/1930 | Mustin | 426/5 |
| 3,455,755 A | | 7/1969 | Phillips | 156/204 |
| 3,857,963 A | | 12/1974 | Graff et al. | 426/3 |
| 4,151,270 A | * | 4/1979 | Ream et al. | 424/48 |
| 4,399,154 A | | 8/1983 | Puglia et al. | 426/5 |
| 4,466,983 A | * | 8/1984 | Cifrese et al. | 426/5 |
| 4,513,012 A | * | 4/1985 | Carroll et al. | 426/5 |
| 4,822,622 A | | 4/1989 | Dokuzovic et al. | 426/5 |
| 4,971,806 A | | 11/1990 | Cherukuri et al. | 426/5 |
| 5,409,715 A | * | 4/1995 | Meyers | 426/5 |
| 5,433,960 A | * | 7/1995 | Meyers | 426/5 |
| 5,437,879 A | * | 8/1995 | Kabse et al. | 426/5 |
| 5,498,429 A | * | 3/1996 | Orlandi | 426/5 |
| 5,626,892 A | | 5/1997 | Kehoe et al. | 426/3 |
| 5,879,728 A | * | 3/1999 | Graff et al. | 426/5 |
| 6,235,318 B1 | * | 5/2001 | Lombardy et al. | 426/3 |

FOREIGN PATENT DOCUMENTS

| | | | |
|---|---|---|---|
| EP | 0785725 | * | 3/1999 |
| GB | 2177587 | | 1/1987 |
| WO | WO 01/10237 | | 2/2001 |

* cited by examiner

Primary Examiner—Nina Bhat
(74) Attorney, Agent, or Firm—Steven P. Shurtz; Brinks Hofer Gilson & Lione

(57) ABSTRACT

A confectionery product having improved shelf life comprises one or more sensation producing ingredients having relatively high moisture absorbing characteristics; and confectionery having relatively low moisture absorbing properties; wherein the one or more sensation producing ingredients is at least substantially encased in the confectionery such that the confectionery serves as a moisture barrier to improve the shelf life of the confectionery product.

15 Claims, 2 Drawing Sheets

CONFECTIONERY PRODUCTS HAVING IMPROVED SHELF LIFE AND METHODS FOR THEIR PRODUCTION

REFERENCE TO EARLIER FIELD APPLICATION

The present application claims the benefit of the filing date under 35 U.S.C. §119(e) of provisional U.S. Application Ser. No. 60/147,311, filed Aug. 5, 1999, which is hereby incorporated by reference.

FIELD OF THE INVENTION

The present invention pertains to improved shelf life for confectionery products having a relatively high level of moisture absorbing ingredients, and more particularly pertains to sour confectionery products and methods for producing sour confectionery products to provide improved shelf life and consumer acceptance.

BACKGROUND OF THE INVENTION

A wide variety of sour confectionery products have gained increased preference among consumers. In particular, there has been a recent trend toward increasingly sour tasting confectionery products, including gum products among others.

It is known to use citric acid, tartaric acid, and/or other food acids to provide confectionery products with a sour sensation. For imparting a conventional, low-level sourness to confectionery products, citric acid or other food acid is mixed in with the confectionery product. However, when attempting to provide high levels of sourness in confectionery products, e.g. when providing citric acid, tartaric acid, or other food acid in a ratio of approximately 3% food acid to confectionery by weight or greater, several shortcomings are realized. Principal amongst these shortcomings is that the hygroscopic characteristic of citric and other food acids results in an unacceptably large amount of water being absorbed by the product, thereby shortening its shelf life to an unacceptable level. Also, direct contact of high concentrations of citric and/or other food acids with the internal mouth surfaces and/or the tongue of the consumer may result in discomfort to the consumer.

Hence, there is a need for confectionery products and methods for producing confectionery products which allows for high levels of citric and/or other food acids to be provided for imparting the desired high-level sourness, while preventing the water absorption problems currently encountered with high-level citric acid or other food acid confectionery products. There is also a need for such high-level citric and/or other food acid confectionery products and methods for producing such confectionery products which do not cause discomfort to the consumer.

Additionally, there is a trend toward stronger "bursts" of sensations in confectionery products such as flavors, cooling agents, sweetness, and the like. This may be achieved by providing relatively high concentrations of the ingredients or agents which produce these sensations. Many of these ingredients have relatively high moisture absorbing properties. Such high concentrations of relatively high moisture absorbing ingredients in typical confectionery products results in them having unacceptably short shelf lives due to moisture absorption deteriorating the quality of the product.

SUMMARY OF THE INVENTION

In accordance with one aspect of the present invention, a confectionery product having citric acid in it in an amount of 2% or greater of citric acid to confectionery product is provided, in which the citric acid is at least substantially entrapped and encased by the confectionery product.

In accordance with a preferred embodiment of the invention, an elongated strip of confectionery product is provided having an upper layer of confectionery product, a lower layer of confectionery product, and a layer of citric and/or other food acid encased between the upper and lower confectionery product layers wherein the citric and/or other food acids are present in a ratio of greater than 3% by weight of the overall confectionery product.

In accordance with another aspect of the present invention, an elongated strand or strip of confectionery product is produced by extruding first and second sheets of confectionery, applying citric acid to one or more surfaces of the sheets of confectionery, and securing the first and second sheets of confectionery to one another to at least substantially encase the citric acid internally of the sheets of confectionery.

In accordance with a still further aspect of the present invention, high concentrations of sensation producing ingredients having relatively high moisture absorbing properties are encased in confectionery product having significantly lower moisture absorbing properties, to provide reduced moisture absorption of the product and extended shelf life.

BRIEF DESCRIPTION OF THE DRAWINGS

In the drawings, wherein like elements are referenced alike.

DETAILED DESCRIPTION OF THE PREFERRED EMBODIMENTS

Figure 4:
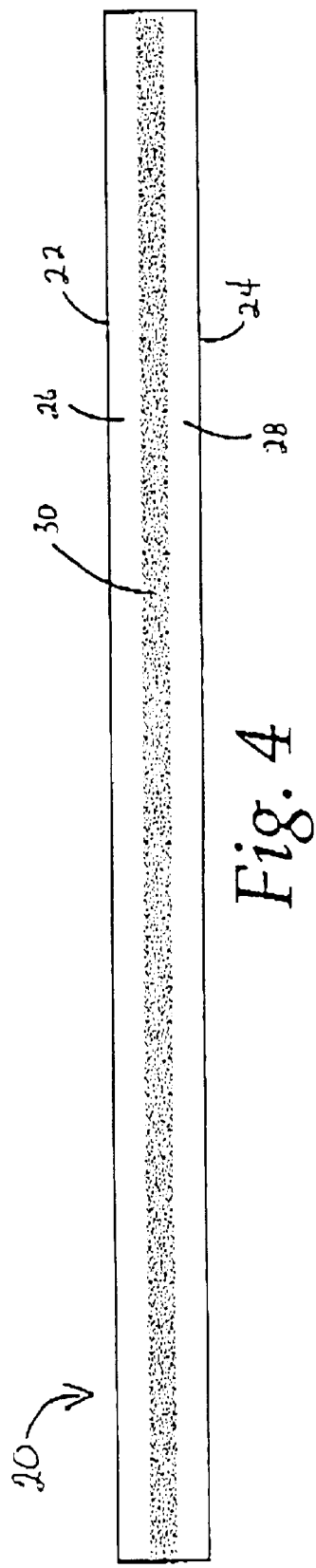
FIG. 4 is a representational view of a section of confectionery product embodying various features of the present invention.

A preferred confectionery product embodying various features of the present invention is illustrated in FIG. 4 and referenced generally by numeral 20. The illustrated confectionery product 20 is in the form of an elongated strip or tape of gum, but it will be readily apparent to those skilled in the art that although the present invention is described primarily with reference to gum as the confectionery product, any of a wide variety of other confectionery products could be utilized. Also, while the preferred and illustrated embodiment discussed herein is primarily with regard to elongated strips of confectionery, the invention lends itself to application in a wide variety of shapes and configurations, and is not limited to the specific shapes specifically discussed herein.

The illustrated confectionery product 20 embodying various features of the present invention is illustrated in FIG. 4 and has upper and lower surfaces 22 and 24 with respective layers of gum 26 and 28 adjacent each of the respective lower and upper surfaces 22 and 24. A layer of citric acid and/or other food acid 30 is disposed between the upper and lower layers of gum 26 and 28 so that the citric acid and/or other food acid 30 is at least substantially encased within the gum. The layer of citric acid and/or other food acid 30 is preferably provided in a quantity such that there is 2% or greater food acid to gum ratio in the total mass of the confectionery product, and more preferably 3% or greater food acid to gum ratio, and still more preferably 3% to 10% food acid to gum ratio.

With the citric and/or other food acid encapsulated by the gum, the food acid is not exposed to atmospheric moisture, with the gum serving as a barrier to exposure of the food acid to atmospheric conditions such as moisture, whereby the undesirable hygroscopic characteristics of citric and/or other food acid are minimized. This allows for the confectionery product 20 to have significantly greater shelf life, particularly in moisture exposed conditions and higher heat conditions, than conventionally-made confectionery products of like food acid concentration. Also, with the citric acid 30 encased by the gum 26 and 28, the mouth and tongue of the user are not exposed to direct contact with a substantial amount or concentration of food acid as would cause discomfort to the consumer.

Figure 1:
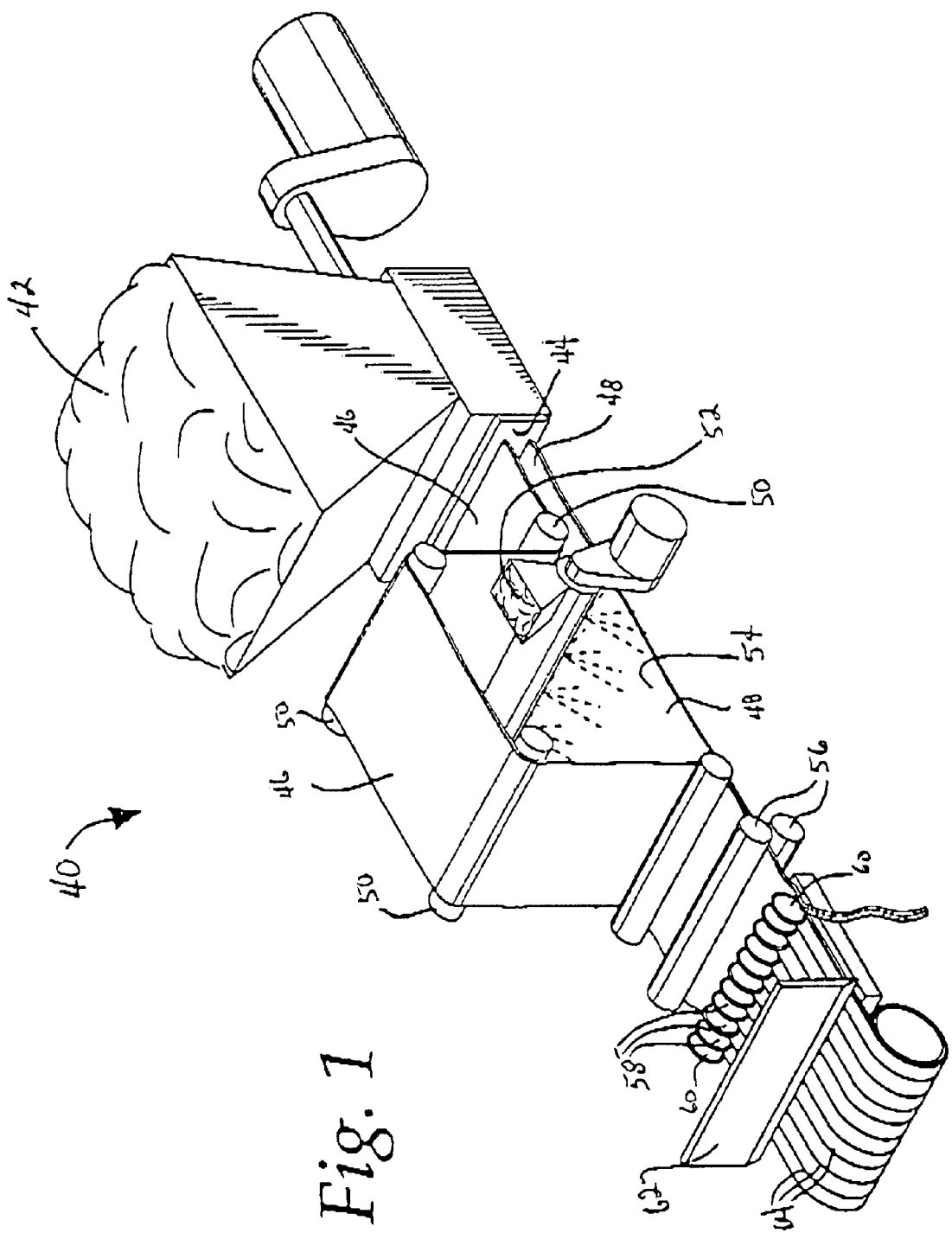
FIG. 1 is a perspective view of an apparatus for producing confectionery products embodying various features of the present invention.
Figure 2:
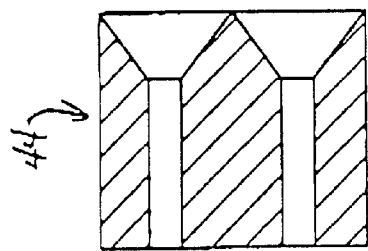
FIG. 2 is a front elevational view of the extruder of the apparatus of FIG. 1.
Figure 3:
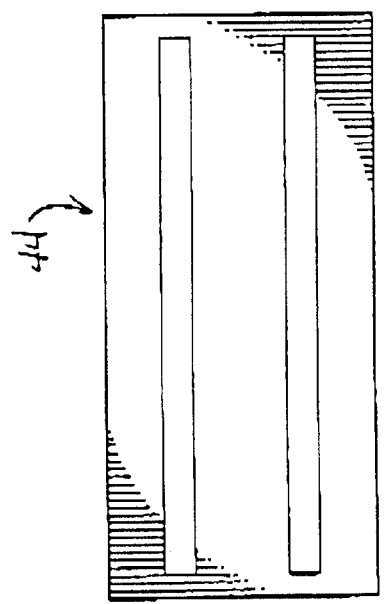
FIG. 3 is a side, sectional view of the extruder of the apparatus of FIG. 2.

An apparatus for producing the confectionery product of FIG. 4 is illustrated in FIG. 1 and referred to generally by reference numeral 40. A quantity of gum 42 (or other confectionery product) is passed through an extruder 44 which extrudes the gum as two separate sheets, upper sheet 46 and lower sheet 48. The sheets 46 and 48 pass around rollers 50 which maintain separation of the upper and lower sheets. A quantity of citric acid 52 is sprinkled or otherwise distributed onto the top surface 54 of the lower sheet of confectionery, such as by the hopper and auger arrangement in the illustrated embodiment. The upper and lower sheets 46 and 48 of confectionery are subsequently brought back together and pressed together such as by rollers 56 whereby the upper and lower sheets of confectionery 46 and 48 adhere together and encase the applied citric and/or other food acid between the upper and lower sheets of confectionery.

In this manner a continuous sheet of confectionery product having high level of citric and/or other food acid is produced. Thereafter, the sheet may be cut and/or formed into any desired configuration. For instance, with the upper and lower sheets of confectionery adhered back together, the continuously produced sheet may be subsequently cut or scored into a desired shape. In the apparatus of FIG. 1, the sheet is scored by scoring rollers 58, with the irregularly shaped edges trimmed off by trim rollers 60, and the scored sheet rolled up and sliced by knife 62 after a selective length of rolled confectionery has been rolled up. The scored rolls of confectionery are then broken along their score lines 64 to produce a plurality of thin, elongated rolls of confectionery containing encased citric and/or other food acid.

The food acid is preferably coarse granular citric acid and/or other suitable food acid, having a granular size of approximately 840 microns to 2000 microns. More powdery food acid and encapsulated citric acid have been found to cause interference with the upper and lower sheets 46 and 48 from properly adhering to one another, which problems were unexpectedly overcome using coarse food acid.

The citric acid and/or other food acid is preferably imparted to the confectionery shortly after extrusion of the confectionery, while the confectionery is still sufficiently warm so that the sheets of confectionery retain their tackiness and stickiness to allow the food acid to adhere to the confectionery and the sheets of confectionery to adhere to one another to encase the citric acid, and maintain its encasement.

As will be appreciated to those skilled in the art, the invention is not limited to the elongated strip confectionery product in the preferred and illustrated embodiment but, rather, lends itself to employment in a wide variety of different shapes of confectionery products in which citric acid and/or other suitable food acid can be at least substantially encased in confectionery. The layers of gum 26 and 28 may also themselves have low levels of food acid, such as less than 2% citric acid by weight.

The invention having thus far been described by way of examples referencing food acids as the hygroscopic ingredient, the invention is not limited in this regard, and the invention lends itself to confectionery products having any relatively high concentration of sensation producing ingredient(s) which is relatively hygroscopic. That is, to reduce the undesirable effects of moisture absorption, and thereby extend the shelf life, in confectionery products having relatively high levels of high moisture absorption ingredients (i.e. low hygroscopicity), the high level moisture absorbing ingredients are encased in, or at least substantially encased in, relatively low moisture absorbing ingredient confectionery.

Further, as will be appreciated, the relatively high moisture absorbing ingredient(s) such as food acid and/or flavoring agent and/or sweetener and/or cooling agent do not have to be completely encased in the confectionery portion having relatively low moisture absorption properties, but preferably a sufficient amount of such ingredient(s) is encased in the confectionery that the concentration of the relatively high moisture absorbing ingredient(s) exposed to atmospheric heat and moisture conditions is low enough that the product maintains its stability for an extended period. Also, preferably a sufficient amount of such ingredient is encased in the confectionery such that the concentration of the ingredient(s) impinging upon the mouth and tongue of the consumer is acceptably low to provide an acceptable sensory perception to the consumer.

In accordance with one aspect of the present invention, any confectionery product may be formed having relatively high moisture absorbing ingredients at least substantially encased in relatively low moisture absorbing ingredients to improve the shelf life of the confectionery product. More specifically, the high moisture absorbing ingredients may be sensation producing ingredients, and the entrapment of the such ingredients in the confectionery allows for higher concentrations of such sensation producing ingredients to be provided without significantly decreasing the shelf life of the product.

While in the preferred embodiment gum is used to encapsulate the food acid, it will be apparent to those skilled in the art that a wide variety of other suitable confectionery could be used instead. A wide variety of modifications to the present invention will be apparent to those skilled in the art and the invention is not limited to the specific embodiments and examples cited herein, but rather encompasses all embodiments falling within the scope and spirit of the accompanying claims.

What is claimed is:

1. A confectionery product having improved shelf life, comprising:
   a) one or more sensation producing ingredients having relatively high moisture absorbing characteristics; and
   b) confectionery having relatively low moisture absorbing properties;
   c) wherein the one or more sensation producing ingredients is at least substantially encased in the confectionery such that the confectionery serves as a moisture barrier to improve the shelf life of the confectionery product, and d) wherein the ratio of sensation producing ingredients to confectionery is 2% or greater.

2. A confectionery product in accordance with claim 1 wherein said one or more sensation producing ingredients is selected from the group consisting of sweeteners, flavoring agents, cooling agents, food acids and combinations thereof.

3. A confectionery product in accordance with claim 1 in which the sensation producing ingredient is a powder at least substantially encased between two layers of confectionery.

4. A confectionery product in accordance with claim 1 in which the center portion of the confectionery product has a relatively high concentration of said sensation producing ingredient.

5. A sour confectionery product, comprising:
   a) an upper layer of confectionery;
   b) a lower layer of confectionery; and
   c) food acid disposed substantially between, and at least substantially encased by, the upper and lower layers of confectionery,
   d) wherein the ratio of food acid to confectionery is 2% or greater.

6. A sour confectionery product in accordance with claim 5 in which the food acid is citric acid.

7. A sour confectionery product in accordance with claim 5 in which the food acid is tartaric acid.

8. A sour confectionery product in accordance with claim 5 in which the upper and lower layers of confectionery are narrow strips of elongated confectionery.

9. A sour confectionery product in accordance with claim 5 in which the ratio of food acid to confectionery is 3% or greater.

10. A sour confectionery product in accordance with claim 5 in which the ratio of food acid to confectionery is between 3% and 10%.

11. A sour confectionery product in accordance with claim 5 which the food acid is coarse granular citric acid.

12. A sour confectionery product in accordance with claim 5 in which the thickness of the confectionery product is less than 0.01 thick.

13. A sour confectionery product, comprising:
   a) a confectionery substance; and
   b) food acid in an amount such that the ratio of food acid to confectionery substance is 3% or greater;
   c) wherein the food acid is at least substantially encased by the confectionery substance.

14. A method for forming a sour confectionery product, comprising:
   a) providing a quantity of confectionery;
   b) extruding the confectionery to form an upper sheet of confectionery and a lower sheet of confectionery;
   c) applying citric acid to at least one of said upper and lower sheets of confectionery; and
   d) pressing the upper and lower sheets of confectionery together to at least substantially encapsulate the citric acid within the confectionery,
   e) wherein the ratio of citric acid to confectionery is 2% or greater.

15. A confectionery product, comprising:
   a) one or more confectionery substances having a relatively high degree of hygroscopicity and containing at least 2% food acid; and
   b) one or more confectionery substances having a relatively low degree of hygroscopicity;
   c) wherein said one or more confectionery substances having a relatively high degree of hygroscopicity is at least substantially encased in said one or more confectionery substances having a relatively low degree of hygroscopicity to provide improved shelf life.

* * * * *